(12) United States Patent
Lee et al.

(10) Patent No.: US 11,763,066 B2
(45) Date of Patent: Sep. 19, 2023

(54) METHOD FOR DETERMINING A DEGREE OF COMPATIBILITY OF A WEB CONTENT WITH A VEHICLE DISPLAY DEVICE AND COMPATIBILITY-DETERMINING SERVER USING THE SAME

(71) Applicant: Obigo Inc., Seongnam-si (KR)

(72) Inventors: Chang Hwan Lee, Suwon-si (KR); Young Min Kim, Seoul (KR)

(73) Assignee: OBIGO INC.

( * ) Notice: Subject to any disclaimer, the term of this patent is extended or adjusted under 35 U.S.C. 154(b) by 0 days.

(21) Appl. No.: 18/055,734

(22) Filed: Nov. 15, 2022

(65) Prior Publication Data
US 2023/0169258 A1    Jun. 1, 2023

(30) Foreign Application Priority Data
Nov. 30, 2021    (KR) .......................... 10-2021-0169591

(51) Int. Cl.
| | |
|---|---|
| *G06F 40/10* | (2020.01) |
| *G06F 40/14* | (2020.01) |
| *G06F 40/117* | (2020.01) |
| *G06F 16/958* | (2019.01) |
| *G06F 16/248* | (2019.01) |

(52) U.S. Cl.
CPC ............ *G06F 40/14* (2020.01); *G06F 16/248* (2019.01); *G06F 16/958* (2019.01); *G06F 40/117* (2020.01)

(58) Field of Classification Search
None
See application file for complete search history.

(56) References Cited

U.S. PATENT DOCUMENTS

| | | | |
|---|---|---|---|
| 6,970,602 B1* | 11/2005 | Smith ................... | H04N 19/186 375/E7.137 |
| 7,349,949 B1* | 3/2008 | Connor ............... | H04L 63/0815 709/200 |
| 8,799,360 B2* | 8/2014 | Nicholson ............. | B60K 35/00 701/1 |

(Continued)

OTHER PUBLICATIONS

Grange et al. "Effective Vehicle Teleoperation on the World Wide Web", 2000 IEEE, 6 pages.*

(Continued)

*Primary Examiner* — Maikhanh Nguyen
(74) *Attorney, Agent, or Firm* — MASCHOFF BRENNAN

(57) ABSTRACT

A method determines a degree of compatibility of a web content with a vehicle display device. The method includes steps of: (a) the compatibility-determining server generating a specific render tree by referring to specific web content information; (b) the compatibility-determining server determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information; and (c) in response to determining that the specific web page is compatible, the compatibility-determining server performing or supporting another device to perform a process of displaying the specific web page on a display of the vehicle display device.

18 Claims, 6 Drawing Sheets

```
┌─────────────────────────────────────────────────────────────┐
│ GENERATING SPECIFIC RENDER TREE BY REFERRING TO SPECIFIC    │── S210
│                 WEB CONTENT INFORMATION                     │
└─────────────────────────────────────────────────────────────┘
                              │
                              ▼
┌─────────────────────────────────────────────────────────────┐
│ DETERMINING WHETHER SPECIFIC WEB PAGE IS COMPATIBLE WITH    │
│ VEHICLE DISPLAY DEVICE ACCORDING TO VERIFYING SCENARIO      │
│ WHICH IS CONFIGURED AS PREDETERMINED PROGRAM BY REFERRING   │── S220
│ TO AT LEAST PART OF (I) AT LEAST ONE FIRST COMPONENT        │
│ INCLUDED IN SPECIFIC RENDER TREE AND (II) AT LEAST ONE      │
│ SECOND COMPONENT INCLUDED IN SPECIFIC SPECIFICATION         │
│                        INFORMATION                          │
└─────────────────────────────────────────────────────────────┘
                              │
                              ▼
┌─────────────────────────────────────────────────────────────┐
│ IN RESPONSE TO DETERMINING THAT SPECIFIC WEB PAGE IS        │── S230
│ COMPATIBLE, DISPLAYING SPECIFIC WEB PAGE ON DISPLAY OF      │
│                  VEHICLE DISPLAY DEVICE                     │
└─────────────────────────────────────────────────────────────┘
```

(56) References Cited

U.S. PATENT DOCUMENTS

| | | | | |
|---|---|---|---|---|
| 2005/0050454 A1* | 3/2005 | Jennery | ............... | G06F 16/9577 |
| | | | | 707/E17.121 |
| 2008/0263566 A1* | 10/2008 | Buerge | .................... | G06F 16/00 |
| | | | | 719/317 |
| 2011/0239134 A1* | 9/2011 | Spataro | .................. | G06Q 10/10 |
| | | | | 715/753 |
| 2013/0219263 A1* | 8/2013 | Abrahami | ........... | G06F 16/9577 |
| | | | | 715/234 |

OTHER PUBLICATIONS

Lind et al. "The Network Vehicle—A Glimpse Into the Future OIF Mobile Multi-Media", 1998 IEEE, 8 pages.*

Al-Rowan et al. "Web-Based Wireless Vehicle Control System", 2003 IEEE, pp. 388-391.*

* cited by examiner

METHOD FOR DETERMINING A DEGREE OF COMPATIBILITY OF A WEB CONTENT WITH A VEHICLE DISPLAY DEVICE AND COMPATIBILITY-DETERMINING SERVER USING THE SAME

CROSS REFERENCE TO RELATED APPLICATION

This application claims the benefit of priority to Korean Patent Application No. 10-2021-0169591, filed on Nov. 30, 2021, the entire contents of which being incorporated herein by reference.

FIELD OF THE DISCLOSURE

The present disclosure relates to a method for determining whether a web content is compatible with a vehicle display device and a compatibility-determining server using the same.

BACKGROUND OF THE DISCLOSURE

A vehicle display device is an essential item in a vehicle and there are increasing demands for various services and contents that can be enjoyed on the vehicle display device.

However, the vehicle display device installed inside the vehicle has varying sizes and layouts depending on a type of each vehicle. Also, because of limitations in terms of hardware, web pages that can be easily used through smartphones and general PCs may not be displayed properly on the vehicle display device. Moreover, even if they are displayed, they are displayed in a manner that is difficult for a user to use them.

Therefore, there is a need for research and development on a method of determining whether each web page is compatible with each vehicle display device. Furthermore, there is a need for a method of determining in advance whether the web pages can be displayed in a manner that is difficult for a user to use them.

SUMMARY OF THE DISCLOSURE

It is an object of the present disclosure to solve all the aforementioned problems.

It is another object of the present disclosure to determine whether a web page is compatible with a vehicle display device.

It is yet another object of the present disclosure to determine whether the web page is compatible with hardware and software environment of the vehicle display device according to a first content verifying scenario.

It is still yet another object of the present disclosure to determine whether a layout of the web page is difficult for the user to view and navigate due to the web page being too large to be displayed on the vehicle display device according to the second content verifying scenario.

In order to accomplish objects above and characteristic effects to be described later of the present disclosure, distinctive structures of the present disclosure are described as follows.

In accordance with one aspect of the present disclosure, there is provided a method of determining a degree of compatibility of a web content with a vehicle display device, wherein specific specification information including information on a specification of the vehicle display device has been stored in a compatibility-determining server, including steps of: (a) in response to receiving specific web content information which represents information on a specific web page to be displayed on the vehicle display device selected by a user, the compatibility-determining server performing or supporting another device to perform a process of generating a specific render tree by referring to the specific web content information; (b) the compatibility-determining server performing or supporting another device to perform a process of determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information; and (c) in response to determining that the specific web page is compatible, the compatibility-determining server performing or supporting another device to perform a process of displaying the specific web page on a display of the vehicle display device.

As one example, at the step of (b), the verifying scenario includes (i) a first content verifying scenario to be used for determining whether the specific web content information is compatible with the specific specification information, and (ii) a second content verifying scenario to be used for determining whether a layout of the specific web page is compatible with a layout of the display of the vehicle display device.

As one example, the first content verifying scenario includes (i) a (1_1)-st content verifying scenario to be used for determining whether a component related to an event handler included in the first component is compatible with the specific specification information, (ii) a (1_2)-nd content verifying scenario to be used for determining whether the first component includes any components incompatible with the specific specification information, (iii) a (1_3)-rd content verifying scenario to be used for determining whether a component related to a size of a text included in the first component is compatible with the specific specification information, and (iv) a (1_4)-th content verifying scenario to be used for determining whether a component related to using an extension program included in the first component is compatible with the specific specification information, wherein the second content verifying scenario includes (v) a (2_1)-st content verifying scenario to be used for determining whether a component related to a media query included in the first component is compatible with the layout of the specific web page, (vi) a (2_2)-nd content verifying scenario to be used for determining whether a component related to scrolling the specific web page to be displayed on the display of the vehicle display device included in the first component is compatible with the layout of the specific web page, (vii) a (2_3)-rd content verifying scenario to be used for determining whether a component related to displaying advertisement included in the first component is compatible with the layout of the specific web page, and (viii) a (2_4)-th content verifying scenario to be used for determining whether a component related to an iframe included in the first component is compatible with the layout of the specific web page.

As one example, during the (1_1)-st content verifying scenario, in case event handler information is included in the first component, the compatibility-determining server determines whether mouse event information is included in the event handler information, to thereby (i) determine that the degree of compatibility of the specific web page with the vehicle display device is below a threshold compatibility in response to determining that only the mouse event information is included in the event handler information and (ii) determine that the degree of compatibility of the specific web page with the vehicle display device is above or equal to the threshold compatibility in response to determining that the mouse event information is not included in the event handler information or that other event handler related information other than the mouse event information is included in the event handler information.

As one example, during the (1_2)-nd content verifying scenario, the compatibility-determining server determines whether motion information, gyroscope information, webcam information, and vibration information are included in the first component, to thereby (i) determine that the degree of compatibility of the specific web page with the vehicle display device is below a threshold compatibility in response to determining that at least one of the motion information, the gyroscope information, the webcam information, and the vibration information is included in the first component, and (ii) determine that the degree of compatibility of the specific web page with the vehicle display device is above or equal to the threshold compatibility in response to determining that none of the motion information, the gyroscope information, the webcam information, and the vibration information is included in the first component.

As one example, during the (1_3)-rd content verifying scenario, in response to calculating a visual arc value by using (i) a pixel value of the text included in the first component, (ii) pixel density information of the vehicle display device included in the second component, and (iii) a distance from the display of the vehicle display device to an upper point of a vehicle seat, the compatibility-determining server determines whether the visual arc value is within a predetermined threshold range, to thereby (1) determine that the degree of compatibility of the specific web page with the vehicle display device is below a threshold compatibility in response to determining that the visual arc value is not within the predetermined threshold range, and (2) determine that the degree of compatibility of the specific web page with the vehicle display device is above or equal to the threshold compatibility in response to determining that the visual arc value is within the predetermined threshold range.

As one example, during the (1_4)-th context verifying scenario, the compatibility-determining server determines whether popup related information and embed tag information of a third party program are included in the first component, to thereby (i) determine that the degree of compatibility of the specific web page with the vehicle display device is below a threshold compatibility in response to determining that at least one of the popup related information and the embed tag information is included in the first component, and (ii) determine that the degree of compatibility of the specific web page with the vehicle display device is above or equal to the threshold compatibility in response to determining that none of the popup related information and the embed tag information is included in the first component.

As one example, during the (2_1)-st content verifying scenario, in response to determining that CSS media query information is included in the first component, the compatibility-determining server compares a CSS media element size having information on a width and a height which is included in the CSS media query information with a display size specification of the vehicle display device included in the second component, to thereby (1) determine that the degree of compatibility of the specific web page with the vehicle display device is below a threshold compatibility in response to determining that the CSS media element size is bigger than the display size specification, and (2) determine that the degree of compatibility of the specific web page with the vehicle display device is above or equal to the threshold compatibility in response to determining that the CSS media element size is smaller than or equal to the display size specification.

As one example, during the (2_2)-nd content verifying scenario, in response to acquiring a specific tag size having information on a tag width and a tag height of a specific tag included in the first component, the compatibility-determining server compares the specific tag size with a display size specification of the vehicle display device, to thereby (1) determine that the degree of compatibility of the specific web page with the vehicle display device is below a threshold compatibility in response to determining that the specific tag size is bigger than the display size specification, and (2) determine that the degree of compatibility of the specific web page with the vehicle display device is above or equal to the threshold compatibility in response to determining that the specific tag size is smaller than or equal to the display size specification, wherein, on condition that the tag width has been determined to be bigger than a display width included in the display size specification and the tag height has been determined to be smaller than and equal to a display height included in the display size specification, the compatibility-determining server determines that the degree of compatibility of the specific web page with the vehicle display device is below the threshold compatibility in response to determining that the tag width exceeds a predetermined first threshold ratio of the display width, and determines that the degree of compatibility of the specific web page with the vehicle display device is above or equal to the threshold compatibility in response to determining that the tag width is less than or equal to the predetermined first threshold ratio of the display width, and wherein, on condition that the tag width has been determined to be smaller than or equal to the display width included in the display size specification and the tag height has been determined to be bigger than the display height included in the display size specification, the compatibility-determining server determines that the degree of compatibility of the specific web page with the vehicle display device is below the threshold compatibility in response to determining that the tag height exceeds a predetermined second threshold ratio of the display height, and determines that the degree of compatibility of the specific web page with the vehicle display device is above or equal to the threshold compatibility in response to determining that the tag height is less than or equal to the predetermined second threshold ratio of the display height.

As one example, during the (2_3)-rd content verifying scenario, in case an advertisement keyword is included in the first component, in response to (i) acquiring at least one advertisement-related tag which includes the advertisement keyword, and (ii) extracting information on a tag size which includes information on a position, a width, and a height from the advertisement-related tag, the compatibility-determining server compares the tag size with a display size specification of the vehicle display device, to thereby (1) determine that the degree of compatibility of the specific web page with the vehicle display device is below a threshold compatibility in response to determining that the tag size exceeds a predetermined third threshold ratio of the display size specification, and (2) determine that the degree of compatibility of the specific web page with the vehicle display device is above and equal to the threshold compatibility in response to determining that the tag size is less than the predetermined third threshold ratio of the display size specification.

As one example, during the (2_4)-th content verifying scenario, in case information related to the iframe is included in the first component, in response to acquiring an iframe tag of the component related to the iframe, the compatibility-determining server compares a size of another web page included in the iframe tag with an iframe size included in the iframe tag, to thereby (1) determine that the degree of compatibility of the specific web page with the vehicle display device is below a threshold compatibility in response to determining that the size of said another web page is bigger than the iframe size, and (2) determine that the degree of compatibility of the specific web page with the vehicle display device is above or equal to the threshold compatibility in response to determining that the size of said another web page is smaller than or equal to the iframe size.

In accordance with another aspect of the present disclosure, there is provided a compatibility-determining server for determining a degree of compatibility of a web content with a vehicle display device, wherein specific specification information including information on a specification of the vehicle display device has been stored in a compatibility-determining server, including: at least one memory that stores instructions; and at least one processor configured to execute the instructions to perform processes of: (I) in response to receiving specific web content information which represents information on a specific web page to be displayed on the vehicle display device selected by a user, generating a specific render tree by referring to the specific web content information; (II) determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information; and, (III) in response to determining that the specific web page is compatible, displaying the specific web page on a display of the vehicle display device.

As one example, at the process of (II), the verifying scenario includes (i) a first content verifying scenario to be used for determining whether the specific web content information is compatible with the specific specification information, and (ii) a second content verifying scenario to be used for determining whether a layout of the specific web page is compatible with a layout of the display of the vehicle display device.

As one example, the first content verifying scenario includes (i) a (1_1)-st content verifying scenario to be used for determining whether a component related to an event handler included in the first component is compatible with the specific specification information, (ii) a (1_2)-nd content verifying scenario to be used for determining whether the first component includes any components incompatible with the specific specification information, (iii) a (1_3)-rd content verifying scenario to be used for determining whether a component related to a size of a text included in the first component is compatible with the specific specification information, and (iv) a (1_4)-th content verifying scenario to be used for determining whether a component related to using an extension program included in the first component is compatible with the specific specification information, wherein the second content verifying scenario includes (v) a (2_1)-st content verifying scenario to be used for determining whether a component related to a media query included in the first component is compatible with the layout of the specific web page, (vi) a (2_2)-nd content verifying scenario to be used for determining whether a component related to scrolling the specific web page to be displayed on the display of the vehicle display device included in the first component is compatible with the layout of the specific web page, (vii) a (2_3)-rd content verifying scenario to be used for determining whether a component related to displaying advertisement included in the first component is compatible with the layout of the specific web page, and (viii) a (2_4)-th content verifying scenario to be used for determining whether a component related to an iframe included in the first component is compatible with the layout of the specific web page.

As one example, during the (1_1)-st content verifying scenario, in case event handler information is included in the first component, the processor determines whether mouse event information is included in the event handler information, to thereby (i) determine that the degree of compatibility of the specific web page with the vehicle display device is below a threshold compatibility in response to determining that only the mouse event information is included in the event handler information and (ii) determine that the degree of compatibility of the specific web page with the vehicle display device is above or equal to the threshold compatibility in response to determining that the mouse event information is not included in the event handler information or that other event handler related information other than the mouse event information is included in the event handler information.

As one example, during the (1_2)-nd content verifying scenario, the processor determines whether motion information, gyroscope information, webcam information, and vibration information are included in the first component, to thereby (i) determine that the degree of compatibility of the specific web page with the vehicle display device is below a threshold compatibility in response to determining that at least one of the motion information, the gyroscope information, the webcam information, and the vibration information is included in the first component, and (ii) determine that the degree of compatibility of the specific web page with the vehicle display device is above or equal to the threshold compatibility in response to determining that none of the motion information, the gyroscope information, the webcam information, and the vibration information is included in the first component.

As one example, during the (1_3)-rd content verifying scenario, in response to calculating a visual arc value by using (i) a pixel value of the text included in the first component, (ii) pixel density information of the vehicle display device included in the second component, and (iii) a distance from the display of the vehicle display device to an upper point of a vehicle seat, the processor determines whether the visual arc value is within a predetermined threshold range, to thereby (1) determine that the degree of compatibility of the specific web page with the vehicle display device is below a threshold compatibility in response to determining that the visual arc value is not within the predetermined threshold range, and (2) determine that the degree of compatibility of the specific web page with the vehicle display device is above or equal to the threshold compatibility in response to determining that the visual arc value is within the predetermined threshold range.

As one example, during the (1_4)-th context verifying scenario, the processor determines whether popup related information and embed tag information of a third party program are included in the first component, to thereby (i)

determine that the degree of compatibility of the specific web page with the vehicle display device is below a threshold compatibility in response to determining that at least one of the popup related information and the embed tag information is included in the first component, and (ii) determine that the degree of compatibility of the specific web page with the vehicle display device is above or equal to the threshold compatibility in response to determining that none of the popup related information and the embed tag information is included in the first component.

As one example, during the (2_1)-st content verifying scenario, in response to determining that CSS media query information is included in the first component, the processor compares a CSS media element size having information on a width and a height which is included in the CSS media query information with a display size specification of the vehicle display device included in the second component, to thereby (1) determine that the degree of compatibility of the specific web page with the vehicle display device is below a threshold compatibility in response to determining that the CSS media element size is bigger than the display size specification, and (2) determine that the degree of compatibility of the specific web page with the vehicle display device is above or equal to the threshold compatibility in response to determining that the CSS media element size is smaller than or equal to the display size specification.

As one example, during the (2_2)-nd content verifying scenario, in response to acquiring a specific tag size having information on a tag width and a tag height of a specific tag included in the first component, the processor compares the specific tag size with a display size specification of the vehicle display device, to thereby (1) determine that the degree of compatibility of the specific web page with the vehicle display device is below a threshold compatibility in response to determining that the specific tag size is bigger than the display size specification, and (2) determine that the degree of compatibility of the specific web page with the vehicle display device is above or equal to the threshold compatibility in response to determining that the specific tag size is smaller than or equal to the display size specification, wherein, on condition that the tag width has been determined to be bigger than a display width included in the display size specification and the tag height has been determined to be smaller than and equal to a display height included in the display size specification, the processor determines that the degree of compatibility of the specific web page with the vehicle display device is below the threshold compatibility in response to determining that the tag width exceeds a predetermined first threshold ratio of the display width, and determines that the degree of compatibility of the specific web page with the vehicle display device is above or equal to the threshold compatibility in response to determining that the tag width is less than or equal to the predetermined first threshold ratio of the display width, and wherein, on condition that the tag width has been determined to be smaller than or equal to the display width included in the display size specification and the tag height has been determined to be bigger than the display height included in the display size specification, the processor determines that the degree of compatibility of the specific web page with the vehicle display device is below the threshold compatibility in response to determining that the tag height exceeds a predetermined second threshold ratio of the display height, and determines that the degree of compatibility of the specific web page with the vehicle display device is above or equal to the threshold compatibility in response to determining that the tag height is less than or equal to the predetermined second threshold ratio of the display height.

As one example, during the (2_3)-rd content verifying scenario, in case an advertisement keyword is included in the first component, in response to (i) acquiring at least one advertisement-related tag which includes the advertisement keyword, and (ii) extracting information on a tag size which includes information on a position, a width, and a height from the advertisement-related tag, the processor compares the tag size with a display size specification of the vehicle display device, to thereby (1) determine that the degree of compatibility of the specific web page with the vehicle display device is below a threshold compatibility in response to determining that the tag size exceeds a predetermined third threshold ratio of the display size specification, and (2) determine that the degree of compatibility of the specific web page with the vehicle display device is above and equal to the threshold compatibility in response to determining that the tag size is less than the predetermined third threshold ratio of the display size specification.

As one example, during the (2_4)-th content verifying scenario, in case information related to the iframe is included in the first component, in response to acquiring an iframe tag of the component related to the iframe, the processor compares a size of another web page included in the iframe tag with an iframe size included in the iframe tag, to thereby (1) determine that the degree of compatibility of the specific web page with the vehicle display device is below a threshold compatibility in response to determining that the size of said another web page is bigger than the iframe size, and (2) determine that the degree of compatibility of the specific web page with the vehicle display device is above or equal to the threshold compatibility in response to determining that the size of said another web page is smaller than or equal to the iframe size.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

DETAILED DESCRIPTION OF THE PREFERRED EMBODIMENTS

Figure 1:
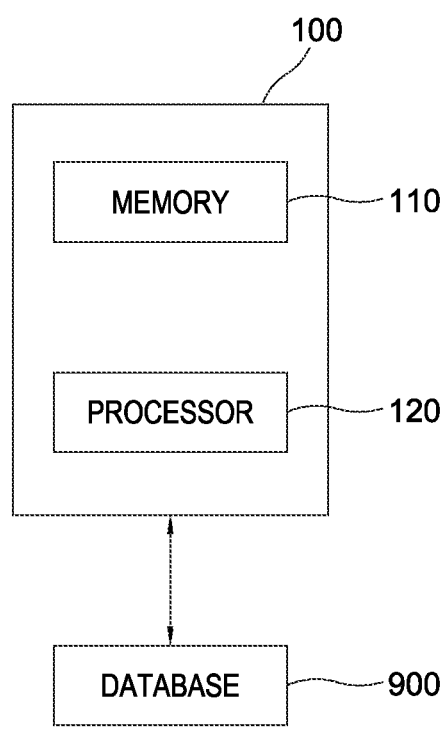
FIG. 1 is a drawing schematically illustrating a compatibility-determining server for determining whether a web content is compatible with a vehicle display device in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a compatibility-determining server 100 for determining whether a web content is compatible with a vehicle display device in accordance with one example embodiment of the present disclosure.

Referring to FIG. 1, the compatibility-determining server 100 may include a memory 110 and a processor 120.

The memory 110 of the compatibility-determining server 100 may store instructions of the processor 120. Herein, the instructions are codes generated for the purpose of allowing the compatibility-determining server 100 to function in a specific manner, and can be implemented in a form of executable program command through a variety of computer means recordable to computer readable media. The instructions are processes to be executed to perform methods of the present disclosure.

Further, the processor 120 of the compatibility-determining server 100 may include hardware configuration of MPU (Micro Processing Unit) or CPU (Central Processing Unit), cache memory, data bus, etc. Additionally, any OS (operating system) and software configuration of applications that achieve specific purposes may be further included. Further, the processor 120 may perform the methods of the present disclosure to be explained hereinafter by executing the instructions stored in the memory 110.

Furthermore, input/output and arithmetic processes of the compatibility-determining server 100 may be performed by a communication part (not illustrated) and the processor 120. However, detailed connections between the communication part (not illustrated) and the processor 120 are omitted in FIG. 1.

Moreover, the compatibility-determining server 100 may communicate with a database 900 which stores information required for performing processes of determining whether a web content is compatible with the vehicle display device. Herein, the database 900 may include at least one storage medium of flash memory type, hard disk type, multimedia card micro type (for example, SD or XD memory), RAM (Random Access Memory), SRAM (Static Random Access Memory), ROM (Read Only Memory), EEPROM (Electrically Erasable Programmable Read Only Memory), PROM (Programmable Read Only Memory), magnetic memory, magnetic disk, optical disk, but it is not limited thereto, and may include any medium capable of storing data. Further, depending on an operating condition of the present disclosure, the database 900 may be installed separately from the compatibility-determining server 100, or may be installed within the compatibility-determining server 100 to transmit and record data, and may also be implemented separately into two or more DBs, contrary to the illustration.

Furthermore, the database 900 may store specific specification information which is information on the specification of the vehicle display device (not illustrated) for each type of vehicle display device, each type of vehicle, and each user. Herein, the specific specification information may include information on (i) display size specification, which is related to size information of area for displaying the web page or a web content, etc., (ii) user input method, which is related to touch input, mouse input, four-way navigation key, etc., (iii) information on a type of external extension device of the vehicle display device such as a camera and GPS antenna (iv) ppi (dpi) and pixel ratio related information of a display of the vehicle display device, and (v) software related information used by the vehicle display device, but it is not limited thereto.

Moreover, the compatibility-determining server 100 may send/receive necessary information to/from a vehicle system (not illustrated) through a communication part (not illustrated).

Further, the compatibility-determining server 100 may send/receive the necessary information to/from the vehicle display device through the communication part. Herein, the vehicle display device may have a browser installed thereon to be able to open URL of the web page and the web content and may have a driver of the browser installed thereon.

Herein, the compatibility-determining server 100 may have the browser installed thereon to be able to open URL of the web page and the web content and may have the driver of the browser installed thereon.

Further, the compatibility-determining server 100 may have the program Selenium installed thereon to be able to provide web applications and web page testing programs. Herein, Selenium may be used to develop verifying scenarios for determining whether the web page is compatible with the vehicle display device. Herein, the verifying scenarios may be stored in Selenium or the database 900. Also, instead of allowing Selenium to directly receive information of the web page, if example browsers such as Chrome, Firefox, Internet Explorer are running, the example browsers may receive the information of the web page through each of drivers corresponding to each of example browsers, to thereby allow the information of the web page to be searched. Herein, Selenium may receive the information of the web page through the driver of the browser installed on the vehicle display device, or through the driver of the browser installed on the compatibility-determining server 100.

Following, a method for determining whether the web content is compatible with the vehicle display device in accordance with one example embodiment of the present disclosure as described above will be described with reference to FIG. 2.

Figure 2:
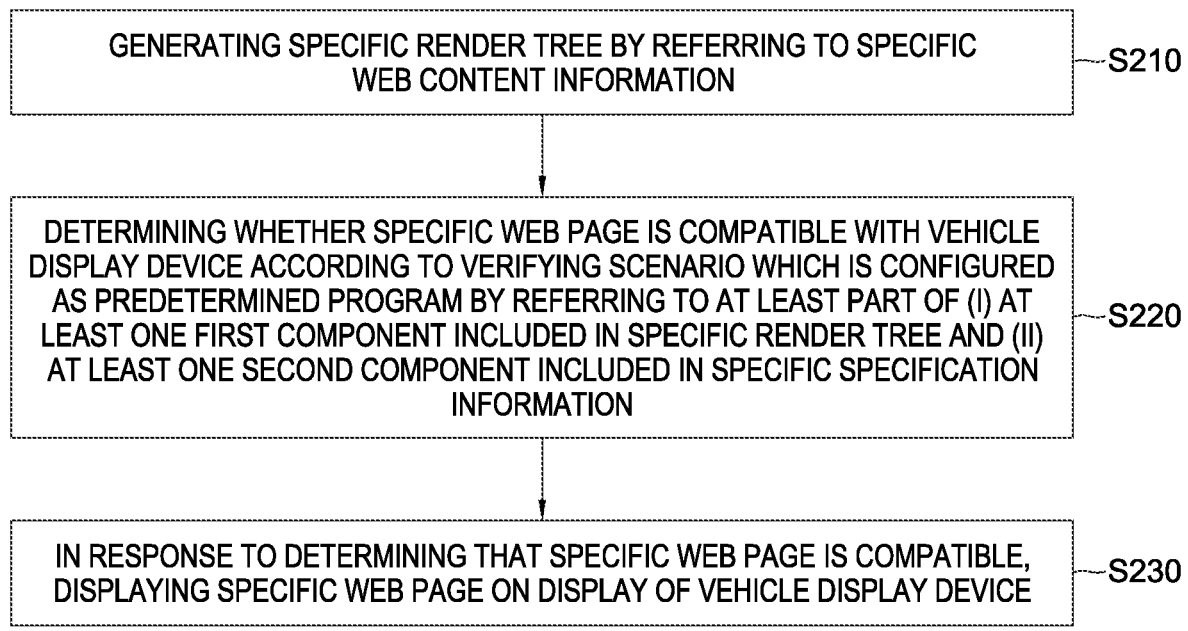
FIG. 2 is a drawing schematically illustrating a method for determining whether the web content is compatible with the vehicle display device in accordance with one example embodiment of the present disclosure.

FIG. 2 is a drawing schematically illustrating the method for determining whether the web content is compatible with the vehicle display device in accordance with one example embodiment of the present disclosure.

First, in response to receiving specific web content information which represents information on a specific web page to be displayed on the vehicle display device selected by a user, the compatibility-determining server 100 may perform or support another device to perform a process of generating a specific render tree by referring to the specific web content information, at a step of S210.

Herein, the specific web content information may include HTML related information, Javascript related information, and CSS related information, but it is not limited thereto.

Further, the compatibility-determining server 100 may use an HTML parser, a JSON parser, and a CSS parser to parse HTML related information, Javascript related information, and CSS related information, to thereby generate the render tree by using parsed results. For reference, a specific render tree may include (i) meta information to be used for calculating each layout (locations, and sizes) of components to be displayed through the specific web page and (ii) paint step information to be used for converting each node therein corresponding to the components to be displayed through the specific web page to actual pixels of the specific web page. That is, information on the components of the specific web page will be included in the specific render tree, however it is not limited thereto.

Furthermore, the compatibility-determining server 100 may perform or support another device to perform a process of determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information, at a step of S220.

Herein, the verifying scenario may include (i) a first content verifying scenario to be used for determining whether the specific web content information is compatible with the specific specification information, and (ii) a second content verifying scenario to be used for determining whether a layout of the specific web page is compatible with a layout of the display of the vehicle display device.

That is, the compatibility-determining server 100 may perform the first content verifying scenario to determine whether the specific web page is compatible with hardware and software environment of the vehicle display device, and may perform the second content verifying scenario to determine whether the layout of the specific web page is difficult for the user to view and navigate due to the specific web page being too large to be displayed on the vehicle display device.

Herein, the first content verifying scenario may include (i) a (1_1)-st content verifying scenario to be used for determining whether a component related to an event handler included in the first component is compatible with the specific specification information, (ii) a (1_2)-nd content verifying scenario to be used for determining whether the first component includes any components incompatible with the specific specification information, (iii) a (1_3)-rd content verifying scenario to be used for determining whether a component related to a size of a text included in the first component is compatible with the specific specification information, and (iv) a (1_4)-th content verifying scenario to be used for determining whether a component related to using an extension program included in the first component is compatible with the specific specification information; and the second content verifying scenario may include (v) a (2_1)-st content verifying scenario to be used for determining whether a component related to a media query included in the first component is compatible with the layout of the specific web page, (vi) a (2_2)-nd content verifying scenario to be used for determining whether a component related to scrolling the specific web page to be displayed on the display of the vehicle display device included in the first component is compatible with the layout of the specific web page, (vii) a (2_3)-rd content verifying scenario to be used for determining whether a component related to displaying advertisement included in the first component is compatible with the layout of the specific web page, and (viii) a (2_4)-th content verifying scenario to be used for determining whether a component related to an iframe included in the first component is compatible with the layout of the specific web page. Further details of the first content verifying scenario and the second content verifying scenario will be explained as follows.

The compatibility-determining server 100 will only determine the specific web page to be compatible with the vehicle display device when a degree of compatibility acquired by performing all the scenarios included in the first content verifying scenario and in the second content verifying scenario corresponding to the specific web page is determined to be above a threshold compatibility.

That is, for example, on condition that the (1_1)-st content verifying scenario, the (1_2)-nd content verifying scenario, the (2_2)-nd content verifying scenario, and the (2_3)-rd content verifying scenario have been performed, if even one among the (1_1)-st content verifying scenario, the (1_2)-nd content verifying scenario, the (2_2)-nd content verifying scenario, and the (2_3)-rd content verifying scenario is determined to be below the threshold compatibility, the compatibility-determining server 100 may determine that the specific web page is incompatible with the vehicle display device.

Next, in response to determining that the specific web page is compatible, the compatibility-determining server 100 may perform or support another device to perform a process of displaying the specific web page on the display of the vehicle display device at a step of S230.

As another example, in response to determining that the specific web page is incompatible, the compatibility-determining server 100 may not display the specific web page on the display of the vehicle display device, but instead display a screen stating that the specific web page is incompatible to be displayed on the display of the vehicle display device to inform the user.

As still another example, in response to determining that the specific web page is compatible, the compatibility-determining server 100 may not display the specific web page on the display of the vehicle display device, but instead display a screen stating that the specific web page is compatible to be displayed on the display of the vehicle display device to lead the user to choose whether to automatically or selectively display the specific web page.

Further, the compatibility-determining server 100 may store and manage the specific web page determined to be compatible in a whitelist, so that when the specific web page is requested in the future, the specific web page is displayed without needing to determine whether it is compatible if the specific web page is requested within a predetermined time limit. However, if the specific web page is requested beyond the predetermined time limit, it may be necessary to determine whether it is compatible.

Meanwhile, further details of the first content verifying scenario and the second content verifying scenario are as follows.

First, during the (1_1)-st content verifying scenario, in case event handler information is included in the first component, the compatibility-determining server 100 may determine whether mouse event information is included in the event handler information. Next, the compatibility-determining server 100 may (i) determine that the degree of compatibility of the specific web page with the vehicle display device is below the threshold compatibility in response to determining that only the mouse event information is included in the event handler information and (ii) determine that the degree of compatibility of the specific web page with the vehicle display device is above or equal to the threshold compatibility in response to determining that the mouse event information is not included in the event handler information or that other event handler related information other than the mouse event information is included in the event handler information.

Herein, the other event handler related information may include touch input of the user, but it is not limited thereto. Additionally, the mouse event information may be at least one of click, mousedown, mouseup, dblclick, mousemove, mouseover, mouseout, mouseenter, mouseleave, and contextmenu.

That is, the (1_1)-st content verifying scenario may be used to prevent the user from using the specific web page that may function improperly by determining whether the specific web page support only the mouse event information and does not support touch event information.

Further, during the (1_2)-nd content verifying scenario, the compatibility-determining server 100 may determine whether motion information, gyroscope information, webcam information, and vibration information are included in the first component. Next, the compatibility-determining server 100 may (i) determine that the degree of compatibility of the specific web page with the vehicle display device is below the threshold compatibility in response to determining that at least one of the motion information, the gyroscope information, the webcam information, and the vibration information is included in the first component, and (ii) determine that the degree of compatibility of the specific web page with the vehicle display device is above or equal to the threshold compatibility in response to determining that none of the motion information, the gyroscope information, the webcam information, and the vibration information is included in the first component.

Herein, the motion information may be deviceMotionEvent information, the gyroscope information may be deviceOrientationEvent information, the webcam information may be one of webcam related APIs such as getUserMedia information, webkitGetUserMedia information, and mozGetUserMedia information, and the vibration information may be one of vibration related APIs such as navigator.vibrate information, webkitVibrate information, mozVibrate information, and msVibrate information, but they are not limited thereto.

That is, the (1_2)-nd content verifying scenario may be used to prevent the user from using the specific web page that may function improperly by detecting whether the specific web page contain components that are incompatible with the vehicle display device.

Further, during the (1_3)-rd content verifying scenario, in response to calculating a visual arc value by using (i) a pixel value of the text included in the first component, (ii) pixel density information (PPI) of the vehicle display device included in the second component, and (iii) a distance from the display of the vehicle display device to an upper point of a vehicle seat, the compatibility-determining server 100 may determine whether the visual arc value is within a predetermined threshold range. Next, the compatibility-determining server 100 may (1) determine that the degree of compatibility of the specific web page with the vehicle display device is below the threshold compatibility in response to determining that the visual arc value is not within the predetermined threshold range, and (2) determine that the degree of compatibility of the specific web page with the vehicle display device is above or equal to the threshold compatibility in response to determining that the visual arc value is within the predetermined threshold range.

Herein, the predetermined threshold range of high readability may be between 0.3 to 0.4, but it is not limited thereto.

Herein, the visual arc may be an angle drawn with respect to a height of an object at a predetermined point when the object having a predetermined height is viewed from the predetermined point separated by a predetermined distance.

Figure 3:
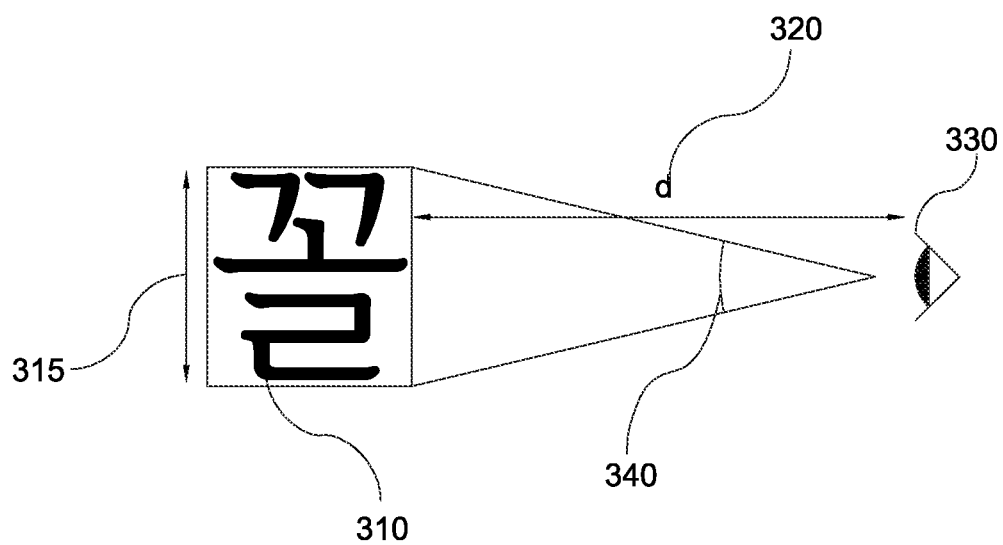
FIG. 3 is a drawing schematically illustrating a (1_3)-rd content verifying scenario in accordance with one example embodiment of the present disclosure.

For example, by referring to FIG. 3, assuming that the object with the predetermined height in this case is the font 310 and the font 310 is viewed from a point 330 separated by a distance d 320, the angle 340 drawn with respect to a height of 315 of the font 310 at the point 330 is the value of the visual arc. Herein, the height 315 of the font 310 may be determined by the pixel value and the PPI information of the vehicle display device. Also, distance d 320 may be determined by a distance from the display of the vehicle display device to an upper point of the vehicle seat and may vary depending on a type of vehicle and a seat setting of the user. This information may have been stored in advance for each type of vehicle for each seat setting of the user, or may have been provided in real-time, but it is not limited thereto.

That is, the (1_3)-rd content verifying scenario may be used to prevent the user from displaying the specific web page that may function improperly due to the specific web page having low-readability on the display of the vehicle display device by determining whether the size of the text included in the specific web page is beyond a predetermined range of size, e.g., too small or too big for the user to read.

In addition, during the (1_4)-th context verifying scenario, the compatibility-determining server 100 may determine whether popup related information and embed tag information of a third party program are included in the first component. Next, the compatibility-determining server 100 may (i) determine that the degree of compatibility of the specific web page with the vehicle display device is below the threshold compatibility in response to determining that at least one of the popup related information and the embed tag information is included in the first component, and (ii) determine that the degree of compatibility of the specific web page with the vehicle display device is above or equal to the threshold compatibility in response to determining that none of the popup related information and the embed tag information is included in the first component.

Herein, the popup related information may be information related to xdg-open, and the embed tag information may be information on an ability to run files with extensions of mp3, asf, wma, wmv, swf, etc.

That is, the (1_4)-th content verifying scenario may be used to prevent the user from displaying the specific web page that may function improperly in case the specific web page contains contents using incompatible extension programs with the vehicle display device.

Further, during the (2_1)-st content verifying scenario, in response to determining that CSS media query information is included in the first component, the compatibility-determining server 100 may compare a CSS media element size having information on a width and a height which is included in the CSS media query information with a display size specification of the vehicle display device included in the second component. Next, the compatibility-determining server 100 may (1) determine that the degree of compatibility of the specific web page with the vehicle display device is below the threshold compatibility in response to determining that the CSS media element size is bigger than the display size specification, and (2) determine that the degree of compatibility of the specific web page with the vehicle display device is above or equal to the threshold compatibility in response to determining that the CSS media element size is smaller than or equal to the display size specification.

That is, the (2_1)-st content verifying scenario may be used to prevent the specific web page with incompatible layout sizes by determining whether the vehicle display device support a layout size of the specific web page that may be displayed differently depending on a media query. For reference, if no CSS media query information is included in the specific web page, the vehicle display device may determine that the degree of compatibility of the specific web page is above or equal to the threshold compatibility.

Additionally, during the (2_2)-nd content verifying scenario, in response to acquiring a specific tag size having information on a tag width and a tag height of a specific tag included in the first component, the compatibility-determining server 100 may compare the specific tag size with a display size specification of the vehicle display device. Next, the compatibility-determining sever 100 may (1) determine that the degree of compatibility of the specific web page with the vehicle display device is below the threshold compatibility in response to determining that the specific tag size is bigger than the display size specification, and (2) determine that the degree of compatibility of the specific web page with the vehicle display device is above or equal to the threshold compatibility in response to determining that the specific tag size is smaller than or equal to the display size specification. Further, in case the tag width is determined to be bigger than a display width included in the display size specification and the tag height is determined to be smaller than and equal to a display height included in the display size specification, the compatibility-determining server 100 may determine whether the tag width exceeds a predetermined first threshold ratio of the display width. In case the tag width exceeds the predetermined first threshold ratio of the display width, the compatibility-determining server 100 may determine that the degree of compatibility of the specific web page with the vehicle display device is below the threshold compatibility. Otherwise, in case the tag width is less than or equal to the predetermined first threshold ratio of the display width, the compatibility-determining server 100 may determine that the degree of compatibility of the specific web page with the vehicle display device is above or equal to the threshold compatibility. Furthermore, in case the tag width is smaller than or equal to the display width included in the display size specification and the tag height is bigger than the display height included in the display size specification, the compatibility-determining server 100 may determine whether the tag height exceeds a predetermined second threshold ratio of the display height. In case the tag height exceeds the predetermined second threshold ratio of the display height, the compatibility-determining server 100 may determine that the degree of compatibility of the specific web page with the vehicle display device is below the threshold compatibility. Otherwise, in case the tag height is less than or equal to the predetermined second threshold ratio of the display height, the compatibility-determining server 100 may determine that the degree of compatibility of the specific web page with the vehicle display device is above or equal to the threshold compatibility.

That is, the (2_2)-nd content verifying scenario may be used to prevent the specific web page that may have low-readability by determining whether scrolling will affect a readability of the specific web site when displayed on the display of the vehicle display device.

Figure 4A:
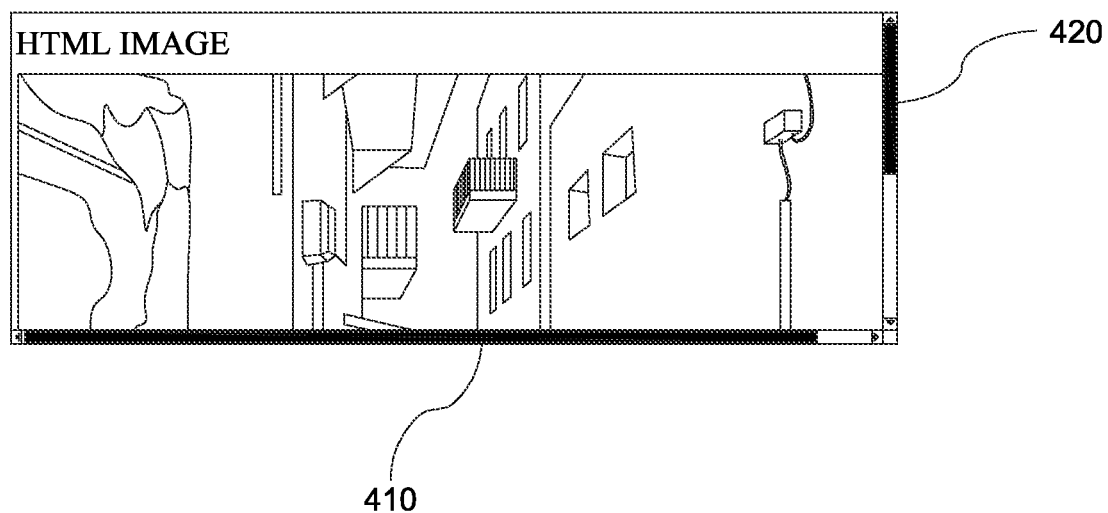
FIG. 4A, FIG. 4B, and FIG. 4C are drawings schematically illustrating a (2_2)-nd content verifying scenario in accordance with one example embodiment of the present disclosure.

For example, by referring to FIG. 4A, in case a size of an HTML image included in the specific web page is bigger than the display size specification, and thus in case a horizontal scroll 410 and a vertical scroll 420 are generated when the specific web page is displayed on the display of the vehicle display device, the compatibility-determining server 100 may determine that the specific web page has a low readability and thus determine that the degree of compatibility of specific web page with the vehicle display device is below the threshold compatibility.

Figure 4B:
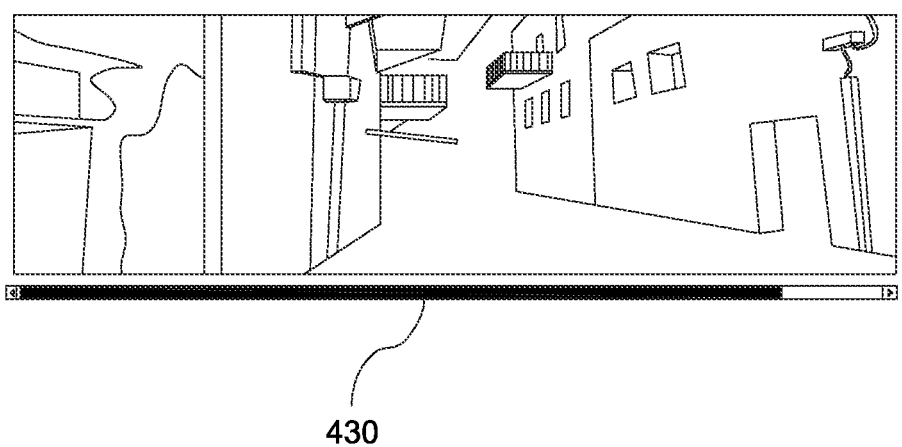

As another example, by referring to FIG. 4B, in case the height of the HTML image included in the specific web page is smaller or equal to the display height but the width of the HTML image is bigger than the display width, and thus in case a horizontal scroll 430 is generated when the HTML image is displayed on the display of the vehicle display device, the compatibility-determining server 100 may determine whether the width of the HTML image is exceeding the first predetermined ratio of the display width (ex. 130%). Herein, if the width of the HTML image is exceeding the first predetermined ratio of the display width (ex. 130%), then the compatibility-determining server 100 may determine that the degree of compatibility of the specific web page with the vehicle display device is below the threshold compatibility.

Figure 4C:
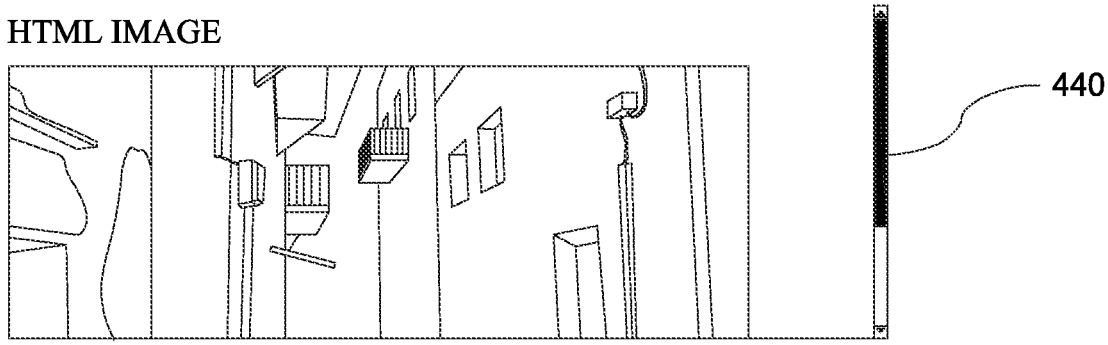

As another example, by referring to FIG. 4C, in case the width of the HTML image included in the specific web page is smaller or equal to the display width but the height of the HTML image is bigger than the display height, and thus in case a vertical scroll 440 is generated when the HTML image is displayed on the display of the vehicle display device, the compatibility-determining server 100 may determine whether the height of the HTML image is exceeding the second predetermined ratio of the display height (ex. 150%). Herein, if the height of the HTML image is exceeding the second predetermined ratio of the display height (ex. 150%), then the compatibility-determining server 100 may determine that the degree of compatibility of the specific web page with the vehicle display device is below the threshold compatibility.

Furthermore, during the (2_3)-rd content verifying scenario, in case an advertisement keyword is included in the first component, the compatibility-determining server 100 may (i) acquire at least one advertisement-related tag which includes the advertisement keyword, (ii) extract information on a tag size which includes information on a position, a width, and a height from the advertisement-related tag, and (iii) compare the tag size with the display size specification of the vehicle display device. Next, the compatibility-determining server 100 may (1) determine that the degree of compatibility of the specific web page with the vehicle display device is below the threshold compatibility in response to determining that the tag size exceeds a predetermined third threshold ratio of the display size specification, and (2) determine that the degree of compatibility of the specific web page with the vehicle display device is above and equal to the threshold compatibility in response to determining that the tag size is less than the predetermined third threshold ratio of the display size specification. For reference, if the first component does not include the advertisement keyword, it may be determined that the degree of compatibility of the specific web page with the vehicle display device is above or equal to the threshold compatibility.

For example, if a keyword "ad" is included in an id or a class of the tag, the compatibility-determining server 100 may determine that the first component includes the advertisement keyword. Specifically, if the advertisement keyword includes at least one of "ad-banner-xxx", "ad", "ads", "xx-ad.xx", "adsbygoogle", etc. in a class name of the tag, the compatibility-determining server 100 may determine that the first component includes the advertisement keyword. And if the advertisement keyword includes at least one of "data-ad-type", "data-aop="ad_ad"", etc. as property in a div tag, the compatibility-determining server 100 may determine that the first component includes the advertisement keyword, but it is not limited thereto.

As another example, if the specific web page includes the advertisement keyword and the third threshold ratio is 30%, the readability of the specific web page will decrease, therefore, the compatibility-determining server 100 may determine that the degree of compatibility of the specific web page with the vehicle display device is below the threshold compatibility.

That is, the (2_3)-rd content verifying scenario may be used to prevent the user from using the specific web page with low readability due to a size of an advertisement included in the specific web content to be displayed on the display of the vehicle display device.

Moreover, during the (2_4)-th content verifying scenario, in case information related to the iframe is included in the first component, the compatibility-determining server 100 may acquire an iframe tag of the component related to the iframe and compare a size of another web page included in the iframe tag with an iframe size included in the iframe tag. Next, the compatibility-determining server 100 may (1) determine that the degree of compatibility of the specific web page with the vehicle display device is below the threshold compatibility in response to determining that the size of said another web page is bigger than the iframe size, and (2) determine that the degree of compatibility of the specific web page with the vehicle display device is above or equal to the threshold compatibility in response to determining that the size of said another web page is smaller than or equal to the iframe size. For reference, if the first component does not include the information related to the iframe, it may determine that the degree of compatibility of the specific web page with the vehicle display device is above or equal to the threshold compatibility.

That is, the (2_4)-th content verifying scenario may be used to prevent the user from using the specific web page with low readability because of scrolls generated due to the size of said another web page being bigger than the iframe size in case another web page is inserted inside the specific web page.

The present invention has an effect of determining whether the specific web page is compatible with the vehicle display device.

The present invention has another effect of determining whether the specific web page is compatible with the hardware and the software environment of the vehicle display device according to the first content verifying scenario.

The present invention has yet another effect of determining whether the layout of the specific web page is difficult for the user to view and navigate due to the specific web page being too large to be displayed on the vehicle display device according to the second content verifying scenario.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of determining a degree of compatibility of a web content with a vehicle display device, wherein specific specification information including information on a specification of the vehicle display device has been stored in a compatibility-determining server, comprising steps of:
    (a) in response to receiving specific web content information which represents information on a specific web page to be displayed on the vehicle display device selected by a user, the compatibility-determining server performing or supporting another device to perform a process of generating a specific render tree by referring to the specific web content information;
    (b) the compatibility-determining server performing or supporting another device to perform a process of determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information; and
    (c) in response to determining that the specific web page is compatible, the compatibility-determining server performing or supporting another device to perform a process of displaying the specific web page on a display of the vehicle display device,
    wherein, at the step of (b), the verifying scenario includes (i) a first content verifying scenario to be used for determining whether the specific web content information is compatible with the specific specification information, and (ii) a second content verifying scenario to be used for determining whether a layout of the specific web page is compatible with a layout of the display of the vehicle display device, wherein the first content verifying scenario includes (i) a (1_1)-st content verifying scenario to be used for determining whether a component related to an event handler included in the first component is compatible with the specific specification information, (ii) a (1_2)-nd content verifying scenario to be used for determining whether the first component includes any components incompatible with the specific specification information, (iii) a (1_3)-rd content verifying scenario to be used for determining whether a component related to a size of a text included in the first component is compatible with the specific specification information, and (iv) a (1_4)-th content verifying scenario to be used for determining whether a component related to using an extension program included in the first component is compatible with the specific specification information, wherein the second content verifying scenario includes (v) a (2_1)-st content verifying scenario to be used for determining whether a component related to a media query included in the first component is compatible with the layout of the specific web page, (vi) a (2_2)-nd content verifying scenario to be used for determining whether a component related to scrolling the specific web page to be displayed on the display of the vehicle display device included in the first component is compatible with the layout of the specific web page, (vii) a (2_3)-rd content verifying scenario to be used for determining whether a component related to displaying advertisement included in the first component is compatible with the layout of the specific web page, and (viii) a (2_4)-th content verifying scenario to be used for determining whether a component related to an iframe included in the first component is compatible with the layout of the specific web page.

2. The method of claim 1, wherein, during the (1_1)-st content verifying scenario, in case event handler information is included in the first component, the compatibility-determining server determines whether mouse event information is included in the event handler information, to thereby (i) determine that the degree of compatibility of the specific web page with the vehicle display device is below a threshold compatibility in response to determining that only the mouse event information is included in the event handler information and (ii) determine that the degree of compatibility of the specific web page with the vehicle display device is above or equal to the threshold compatibility in response to determining that the mouse event information is not included in the event handler information or that other event handler related information other than the mouse event information is included in the event handler information.

3. The method of claim 1, wherein, during the (1_2)-nd content verifying scenario, the compatibility-determining server determines whether motion information, gyroscope information, webcam information, and vibration information are included in the first component, to thereby (i) determine that the degree of compatibility of the specific web page with the vehicle display device is below a threshold compatibility in response to determining that at least one of the motion information, the gyroscope information, the webcam information, and the vibration information is included in the first component, and (ii) determine that the degree of compatibility of the specific web page with the vehicle display device is above or equal to the threshold compatibility in response to determining that none of the motion information, the gyroscope information, the webcam information, and the vibration information is included in the first component.

4. The method of claim 1, wherein, during the (1_3)-rd content verifying scenario, in response to calculating a visual arc value by using (i) a pixel value of the text included in the first component, (ii) pixel density information of the vehicle display device included in the second component, and (iii) a distance from the display of the vehicle display device to an upper point of a vehicle seat, the compatibility-determining server determines whether the visual arc value is within a predetermined threshold range, to thereby (1) determine that the degree of compatibility of the specific web page with the vehicle display device is below a threshold compatibility in response to determining that the visual arc value is not within the predetermined threshold range, and (2) determine that the degree of compatibility of the specific web page with the vehicle display device is above or equal to the threshold compatibility in response to determining that the visual arc value is within the predetermined threshold range.

5. The method of claim 1, wherein, during the (1_4)-th context verifying scenario, the compatibility-determining server determines whether popup related information and embed tag information of a third party program are included in the first component, to thereby (i) determine that the degree of compatibility of the specific web page with the vehicle display device is below a threshold compatibility in response to determining that at least one of the popup related information and the embed tag information is included in the first component, and (ii) determine that the degree of compatibility of the specific web page with the vehicle display device is above or equal to the threshold compatibility in response to determining that none of the popup related information and the embed tag information is included in the first component.

6. The method of claim 1, wherein, during the (2_1)-st content verifying scenario, in response to determining that CSS media query information is included in the first component, the compatibility-determining server compares a CSS media element size having information on a width and a height which is included in the CSS media query information with a display size specification of the vehicle display device included in the second component, to thereby (1) determine that the degree of compatibility of the specific web page with the vehicle display device is below a threshold compatibility in response to determining that the CSS media element size is bigger than the display size specification, and (2) determine that the degree of compatibility of the specific web page with the vehicle display device is above or equal to the threshold compatibility in response to determining that the CSS media element size is smaller than or equal to the display size specification.

7. The method of claim 1, wherein, during the (2_2)-nd content verifying scenario, in response to acquiring a specific tag size having information on a tag width and a tag height of a specific tag included in the first component, the compatibility-determining server compares the specific tag size with a display size specification of the vehicle display device, to thereby (1) determine that the degree of compatibility of the specific web page with the vehicle display device is below a threshold compatibility in response to determining that the specific tag size is bigger than the display size specification, and (2) determine that the degree of compatibility of the specific web page with the vehicle display device is above or equal to the threshold compatibility in response to determining that the specific tag size is smaller than or equal to the display size specification, wherein, on condition that the tag width has been determined to be bigger than a display width included in the display size specification and the tag height has been determined to be smaller than and equal to a display height included in the display size specification, the compatibility-determining server determines that the degree of compatibility of the specific web page with the vehicle display device is below the threshold compatibility in response to determining that the tag width exceeds a predetermined first threshold ratio of the display width, and determines that the degree of compatibility of the specific web page with the vehicle display device is above or equal to the threshold compatibility in response to determining that the tag width is less than or equal to the predetermined first threshold ratio of the display width, and wherein, on condition that the tag width has been determined to be smaller than or equal to the display width included in the display size specification and the tag height has been determined to be bigger than the display height included in the display size specification, the compatibility-determining server determines that the degree of compatibility of the specific web page with the vehicle display device is below the threshold compatibility in response to determining that the tag height exceeds a predetermined second threshold ratio of the display height, and determines that the degree of compatibility of the specific web page with the vehicle display device is above or equal to the threshold compatibility in response to determining that the tag height is less than or equal to the predetermined second threshold ratio of the display height.

8. The method of claim 1, wherein, during the (2_3)-rd content verifying scenario, in case an advertisement keyword is included in the first component, in response to (i) acquiring at least one advertisement-related tag which includes the advertisement keyword, and (ii) extracting information on a tag size which includes information on a position, a width, and a height from the advertisement-related tag, the compatibility-determining server compares the tag size with a display size specification of the vehicle display device, to thereby (1) determine that the degree of compatibility of the specific web page with the vehicle display device is below a threshold compatibility in response to determining that the tag size exceeds a predetermined third threshold ratio of the display size specification, and (2) determine that the degree of compatibility of the specific web page with the vehicle display device is above and equal to the threshold compatibility in response to determining that the tag size is less than the predetermined third threshold ratio of the display size specification.

9. The method of claim 1, wherein, during the (2_4)-th content verifying scenario, in case information related to the iframe is included in the first component, in response to acquiring an iframe tag of the component related to the iframe, the compatibility-determining server compares a size of another web page included in the iframe tag with an iframe size included in the iframe tag, to thereby (1) determine that the degree of compatibility of the specific web page with the vehicle display device is below a threshold compatibility in response to determining that the size of said another web page is bigger than the iframe size, and (2) determine that the degree of compatibility of the specific web page with the vehicle display device is above or equal to the threshold compatibility in response to determining that the size of said another web page is smaller than or equal to the iframe size.

10. A compatibility-determining server for determining a degree of compatibility of a web content with a vehicle display device, wherein specific specification information including information on a specification of the vehicle display device has been stored in a compatibility-determining server, comprising:

at least one memory that stores instructions; and at least one processor configured to execute the instructions to perform processes of: (I) in response to receiving specific web content information which represents information on a specific web page to be displayed on the vehicle display device selected by a user, generating a specific render tree by referring to the specific web content information; (II) determining whether the specific web page is compatible with the vehicle display device according to a verifying scenario, wherein the verifying scenario is configured as a predetermined program by referring to at least part of (i) at least one first component included in the specific render tree and (ii) at least one second component included in the specific specification information; and (III) in response to determining that the specific web page is compatible, displaying the specific web page on a display of the vehicle display device, wherein, at the process of (II), the verifying scenario includes (i) a first content verifying scenario to be used for determining whether the specific web content information is compatible with the specific specification information, and (ii) a second content verifying scenario to be used for determining whether a layout of the specific web page is compatible with a layout of the display of the vehicle display device, wherein the first content verifying scenario includes (i) a (1_1)-st content verifying scenario to be used for determining whether a component related to an event handler included in the first component is compatible with the specific specification information, (ii) a (1_2)-nd content verifying scenario to be used for determining whether the first component includes any components incompatible with the specific specification information, (iii) a (1_3)-rd content verifying scenario to be used for determining whether a component related to a size of a text included in the first component is compatible with the specific specification information, and (iv) a (1_4)-th content verifying scenario to be used for determining whether a component related to using an extension program included in the first component is compatible with the specific specification information, wherein the second content verifying scenario includes (v) a (2_1)-st content verifying scenario to be used for determining whether a component related to a media query included in the first component is compatible with the layout of the specific web page, (vi) a (2_2)-nd content verifying scenario to be used for determining whether a component related to scrolling the specific web page to be displayed on the display of the vehicle display device included in the first component is compatible with the layout of the specific web page, (vii) a (2_3)-rd content verifying scenario to be used for determining whether a component related to displaying advertisement included in the first component is compatible with the layout of the specific web page, and (viii) a (2_4)-th content verifying scenario to be used for determining whether a component related to an iframe included in the first component is compatible with the layout of the specific web page.

11. The compatibility-determining server of claim 10, wherein, during the (1_1)-st content verifying scenario, in case event handler information is included in the first component, the processor determines whether mouse event information is included in the event handler information, to thereby (i) determine that the degree of compatibility of the specific web page with the vehicle display device is below a threshold compatibility in response to determining that only the mouse event information is included in the event handler information and (ii) determine that the degree of compatibility of the specific web page with the vehicle display device is above or equal to the threshold compatibility in response to determining that the mouse event information is not included in the event handler information or that other event handler related information other than the mouse event information is included in the event handler information.

12. The compatibility-determining server of claim 10, wherein, during the (1_2)-nd content verifying scenario, the processor determines whether motion information, gyroscope information, webcam information, and vibration information are included in the first component, to thereby (i) determine that the degree of compatibility of the specific web page with the vehicle display device is below a threshold compatibility in response to determining that at least one of the motion information, the gyroscope information, the webcam information, and the vibration information is included in the first component, and (ii) determine that the degree of compatibility of the specific web page with the vehicle display device is above or equal to the threshold compatibility in response to determining that none of the motion information, the gyroscope information, the webcam information, and the vibration information is included in the first component.

13. The compatibility-determining server of claim 10, wherein, during the (1_3)-rd content verifying scenario, in response to calculating a visual arc value by using (i) a pixel value of the text included in the first component, (ii) pixel density information of the vehicle display device included in the second component, and (iii) a distance from the display of the vehicle display device to an upper point of a vehicle seat, the processor determines whether the visual arc value is within a predetermined threshold range, to thereby (1) determine that the degree of compatibility of the specific web page with the vehicle display device is below a threshold compatibility in response to determining that the visual arc value is not within the predetermined threshold range, and (2) determine that the degree of compatibility of the specific web page with the vehicle display device is above or equal to the threshold compatibility in response to determining that the visual arc value is within the predetermined threshold range.

14. The compatibility-determining server of claim 10, wherein, during the (1_4)-th context verifying scenario, the processor determines whether popup related information and embed tag information of a third party program are included in the first component, to thereby (i) determine that the degree of compatibility of the specific web page with the vehicle display device is below a threshold compatibility in response to determining that at least one of the popup related information and the embed tag information is included in the first component, and (ii) determine that the degree of compatibility of the specific web page with the vehicle display device is above or equal to the threshold compatibility in response to determining that none of the popup related information and the embed tag information is included in the first component.

15. The compatibility-determining server of claim 10, wherein, during the (2_1)-st content verifying scenario, in response to determining that CSS media query information is included in the first component, the processor compares a CSS media element size having information on a width and a height which is included in the CSS media query information with a display size specification of the vehicle display device included in the second component, to thereby (1) determine that the degree of compatibility of the specific web page with the vehicle display device is below a threshold compatibility in response to determining that the CSS media element size is bigger than the display size specification, and (2) determine that the degree of compatibility of the specific web page with the vehicle display device is above or equal to the threshold compatibility in response to determining that the CSS media element size is smaller than or equal to the display size specification.

16. The compatibility-determining server of claim 10, wherein, during the (2_2)-nd content verifying scenario, in response to acquiring a specific tag size having information on a tag width and a tag height of a specific tag included in the first component, the processor compares the specific tag size with a display size specification of the vehicle display device, to thereby (1) determine that the degree of compatibility of the specific web page with the vehicle display device is below a threshold compatibility in response to determining that the specific tag size is bigger than the display size specification, and (2) determine that the degree of compatibility of the specific web page with the vehicle display device is above or equal to the threshold compatibility in response to determining that the specific tag size is smaller than or equal to the display size specification,
  wherein, on condition that the tag width has been determined to be bigger than a display width included in the display size specification and the tag height has been determined to be smaller than and equal to a display height included in the display size specification, the processor determines that the degree of compatibility of the specific web page with the vehicle display device is below the threshold compatibility in response to determining that the tag width exceeds a predetermined first threshold ratio of the display width, and determines that the degree of compatibility of the specific web page with the vehicle display device is above or equal to the threshold compatibility in response to determining that the tag width is less than or equal to the predetermined first threshold ratio of the display width, and
  wherein, on condition that the tag width has been determined to be smaller than or equal to the display width included in the display size specification and the tag height has been determined to be bigger than the display height included in the display size specification, the processor determines that the degree of compatibility of the specific web page with the vehicle display device is below the threshold compatibility in response to determining that the tag height exceeds a predetermined second threshold ratio of the display height, and determines that the degree of compatibility of the specific web page with the vehicle display device is above or equal to the threshold compatibility in response to determining that the tag height is less than or equal to the predetermined second threshold ratio of the display height.

17. The compatibility-determining server of claim 10, wherein, during the (2_3)-rd content verifying scenario, in case an advertisement keyword is included in the first component, in response to (i) acquiring at least one advertisement-related tag which includes the advertisement keyword, and (ii) extracting information on a tag size which includes information on a position, a width, and a height from the advertisement-related tag, the processor compares the tag size with a display size specification of the vehicle display device, to thereby (1) determine that the degree of compatibility of the specific web page with the vehicle display device is below a threshold compatibility in response to determining that the tag size exceeds a predetermined third threshold ratio of the display size specification, and (2) determine that the degree of compatibility of the specific web page with the vehicle display device is above and equal to the threshold compatibility in response to determining that the tag size is less than the predetermined third threshold ratio of the display size specification.

18. The compatibility-determining server of claim 10, wherein, during the (2_4)-th content verifying scenario, in case information related to the iframe is included in the first component, in response to acquiring an iframe tag of the component related to the iframe, the processor compares a size of another web page included in the iframe tag with an iframe size included in the iframe tag, to thereby (1) determine that the degree of compatibility of the specific web page with the vehicle display device is below a threshold compatibility in response to determining that the size of said another web page is bigger than the iframe size, and (2) determine that the degree of compatibility of the specific web page with the vehicle display device is above or equal to the threshold compatibility in response to determining that the size of said another web page is smaller than or equal to the iframe size.

* * * * *